United States Patent
Na (10) Patent No.: US 6,900,614 B2
(45) Date of Patent: May 31, 2005

(54) ROTATION SPEED SEARCH APPARATUS FOR INCREASING AN OUTPUT VOLTAGE OF AN INVERTER AND METHOD THEREOF

(75) Inventor: Seung-Ho Na, Seoul (KR)

(73) Assignee: LG Industrial Systems Co., Ltd., Seoul (KR)

( * ) Notice: Subject to any disclaimer, the term of this patent is extended or adjusted under 35 U.S.C. 154(b) by 146 days.

(21) Appl. No.: 10/386,675

(22) Filed: Mar. 13, 2003

(65) Prior Publication Data

US 2003/0173930 A1 Sep. 18, 2003

(30) Foreign Application Priority Data

Mar. 14, 2002 (KR) .................. 10-2002-0013916

(51) Int. Cl.[7] .............. H02P 3/18; H02P 5/28; H02P 7/36
(52) U.S. Cl. .............. 318/772; 318/773; 318/807; 318/821
(58) Field of Search ............ 318/772, 773, 318/799, 800, 803, 813, 254, 779, 821

(56) References Cited

U.S. PATENT DOCUMENTS

| 3,986,463 | A | * | 10/1976 | Houston et al. ............ 111/200 |
| 4,158,163 | A | * | 6/1979 | Eriksen et al. ............ 318/798 |
| 4,315,203 | A | * | 2/1982 | Ibamoto et al. ............ 318/807 |
| 4,330,817 | A | * | 5/1982 | Avar et al. ............ 363/96 |
| 4,901,001 | A | * | 2/1990 | Saito et al. ............ 318/779 |
| 4,924,168 | A | * | 5/1990 | Horie et al. ............ 318/811 |
| 5,256,944 | A | * | 10/1993 | Tobise et al. ............ 318/799 |
| 5,500,581 | A | * | 3/1996 | Hatanaka et al. ............ 318/727 |
| 6,194,864 | B1 | * | 2/2001 | Kinpara et al. ............ 318/805 |
| 6,741,063 | B2 | * | 5/2004 | Sakai et al. ............ 318/809 |

FOREIGN PATENT DOCUMENTS

JP 356044395 A * 4/1991 ............ H02P/7/62

* cited by examiner

Primary Examiner—David Martin
Assistant Examiner—Tyrone Smith
(74) Attorney, Agent, or Firm—Greenblum & Bernstein, P.L.C.

(57) ABSTRACT

A rotation speed search apparatus for an induction motor includes: a voltage control unit for comparing a rated current of a motor and a current detected from the motor and generating an output voltage; and a frequency control unit for comparing a reference excitation current of the motor and an excitation current detected from the motor and generating an output frequency. In case of a big load, an output frequency is reduced. Thus, the slip of the motor is moved to a slip where a maximum torque is generated to enable the induction motor to start. If the speed of the motor in operation is greater than a target frequency, an output frequency is increased, so that the motor can be operated even in the regenerative region of the motor.

12 Claims, 6 Drawing Sheets

ROTATION SPEED SEARCH APPARATUS FOR INCREASING AN OUTPUT VOLTAGE OF AN INVERTER AND METHOD THEREOF

BACKGROUND OF THE INVENTION

1. Field of the Invention

The present invention relates to a rotation speed search apparatus for an induction motor and its method, and more particularly, to a rotation speed search apparatus for an induction motor and its method that are capable of optimally increasing an output voltage of an inverter to reach a target voltage in any circumstances by increasing the voltage of the inverter by using an actual current flowing at a motor.

2. Description of the Background Art

In general, when an induction motor is driven through an inverter, it is a frequent occurrence that the inverter needs to be started while the induction motor is being driven (for instance, in case of an instantaneous power failure, re-starting after broken down or in case that the induction motor is connected to the same load in parallel). In this case, in order to drive the induction motor through the inverter without causing any excessiveness, a voltage and a frequency should be suitably inputted from the inverter to the motor in the ratio of V (rated voltage)/F (rated frequency) corresponding to a rotation speed of the induction motor.

An apparatus and method for searching a rotation speed of an induction motor by controlling an output voltage and an output frequency of the inverter for a normal operation of the inverter will now be described with reference to FIG. 1.

Figure 1:
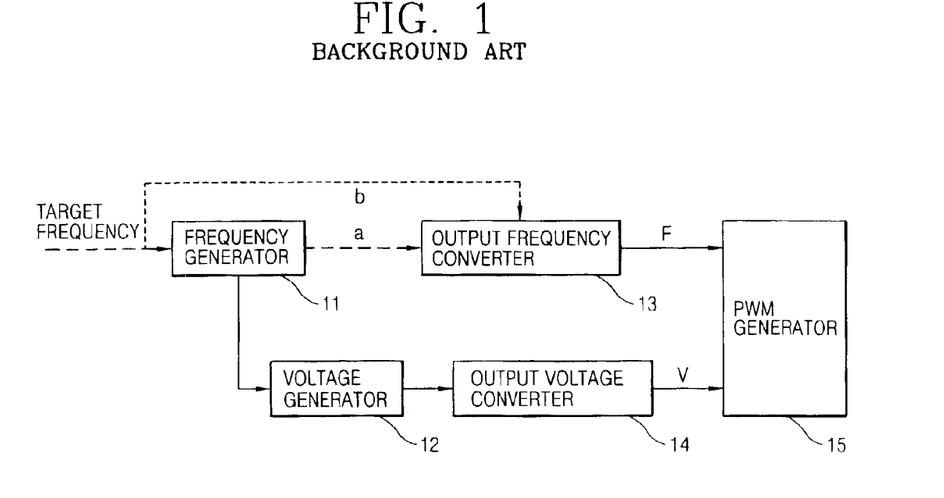
FIG. 1 is a schematic block diagram of a rotation speed search apparatus of an induction motor in accordance with a conventional art.

FIG. 1 is a block diagram of a rotation speed search apparatus for an induction motor in accordance with a conventional art.

First, in case that a motor of an induction motor is normally accelerated, a frequency generator 11 receives a target frequency according to user's input. The frequency generator 11 then generates the target frequency as a frequency having a ramp waveform during pre-set accelerating time and outputs it.

The output frequency outputted from the frequency generator 11 is converted into a frequency suitable for generating a PWM signal in an output frequency converter 13 and inputted to a PWM (Pulse Width Modulation) generator 15.

The output frequency outputted from the frequency generator 11 is inputted to a voltage generator 12 and then converted into a voltage having a frequency suitable for generating a PWM signal in an output voltage converter 14 and inputted to the PWM generator 15. The voltage inputted to the output voltage converter 14 has a value of input frequency * (V/F ratio).

Thereafter, in order to start the induction motor, the PWM generator 15 receives the output voltage and the output frequency to generate a PWM signal and outputs the PWM signal to the motor to start it.

When the motor is normally started by using the above-described method, the V/F ratio is constantly maintained.

As afore-mentioned, the rotation speed search method signifies searching a rotation speed of the motor and starting the motor in a state that the speed of the motor is not '0' due to an abnormal situation such as an instantaneous power failure.

The motor speed search method in an abnormal situation will now be described in detail.

To begin with, if a motor speed is to be searched in an abnormal situation, a target frequency is inputted directly to the PWM generator 15 like 'b' without passing through the frequency generator 11. In other words, if a user's command (that is, a target frequency) is 60 Hz, an output frequency becomes 60 Hz. At this time, assuming that 220V, suitable to 60 Hz, is applied to the motor (that is, only for a 220V class motor), that is operating at around 60 Hz, there is no problem. But if the rotation speed of the motor is slow due to a power failure or the like and 220V is directly applied thereto, an excessive current flows from the inverter to the motor, which can damage the motor.

Therefore, in order to solve the problem, in the conventional art, upon the occurrence of the problematic situation, even if the output frequency is 60 Hz, it is controlled such that the output voltage is gradually increased from '0' so that 220V can be applied to the motor after a certain acceleration time.

Figure 2A:
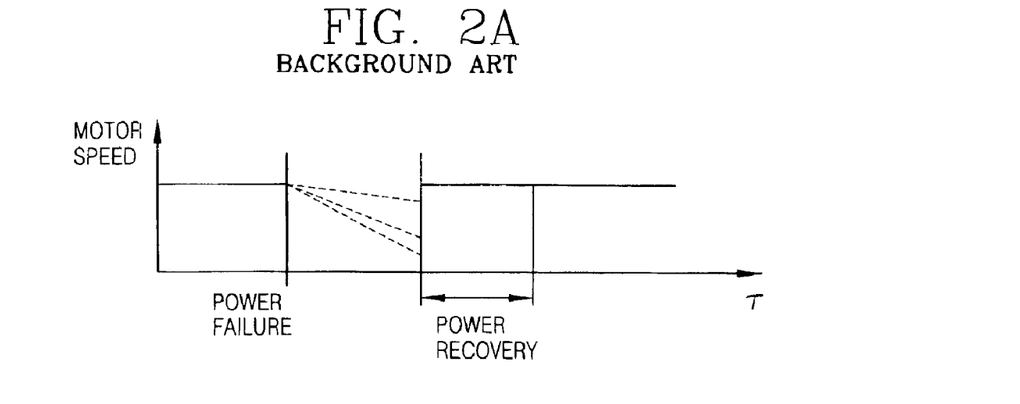
FIGS. 2A to 2C are graphs showing an operation interval for searching a rotation speed of the induction motor.
Figure 2B:
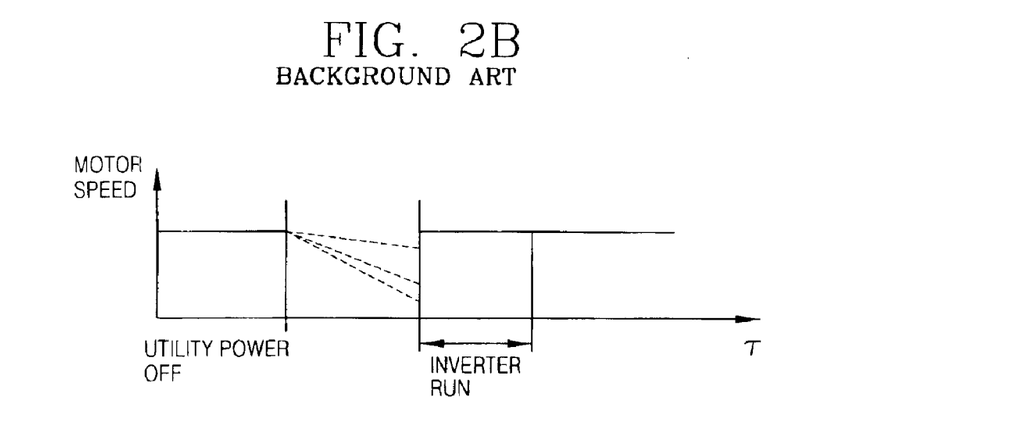
Figure 2C:
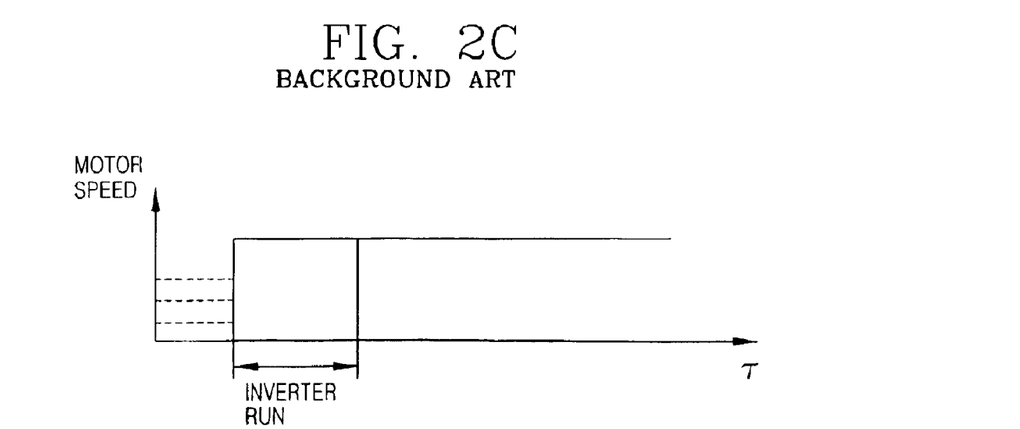

FIGS. 2A to 2C are graphs showing an operation interval for searching a rotation speed of the induction motor.

As shown, an operation interval for searching a rotation speed of the induction motor is divided into three cases: first case where power failure occurs during operation of the motor and then power is recovered (FIG. 2A); second case where utility power is OFF and the motor is operated again (FIG. 2B), and third case where the motor being rotated is promoted to a target rotation speed (FIG. 2C).

In this manner, the induction motor speed searching is performed by controlling the voltage and the frequency, outputted from the inverter, so that the inverter can be normally operated when a rotation speed of the motor is unknown.

Figure 3A:
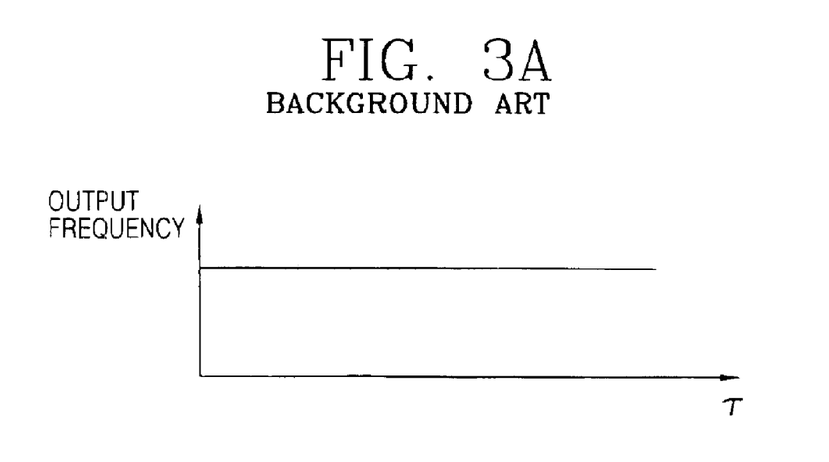
FIGS. 3A and 3B are graphs showing a method for simply controlling an output voltage of the inverter in order to search a rotation speed of the induction motor in accordance with the conventional art.
Figure 3B:
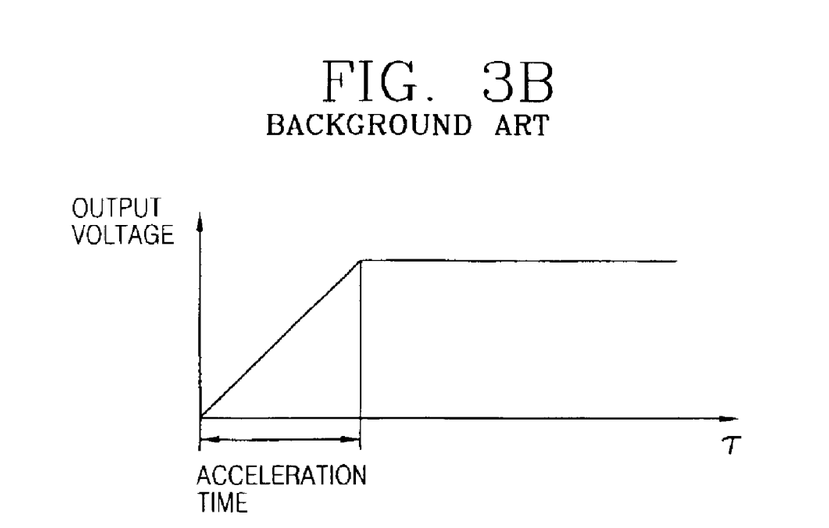

FIGS. 3A and 3B are graphs showing a method for simply controlling an output voltage of the inverter in order to searching a rotation speed of the induction motor in accordance with the conventional art.

As shown, the output frequency of the inverter is maintained to have a certain target frequency over time (FIG. 3A) while the output voltage of the inverter is increased to have a certain tilt over certain acceleration time, so as to reach a target voltage (FIG. 3B).

On the assumption that an output voltage of the inverter is 'n', it can be expressed that the output voltage (n)=an output voltage prior to certain time (n−1)+dv (dv=target voltage/acceleration time). The output voltage is increased with a certain tilt from voltage '0' to the target voltage during certain acceleration time.

However, the conventional method in which the output frequency of the inverter is fixed to be constant and a speed of the induction motor is searched and controlled by using only the output voltage has the following problems.

First, in case of a load with a strong inertia, if acceleration time is short, there occurs an overload trip, and with the big load, if acceleration time is lengthened, the speed of the motor drops to '0'. Therefore, a user should directly set the acceleration time of the induction motor.

In addition, in case of a big load, the output frequency of the inverter applied to the motor becomes the target frequency and the slip of the motor nears '0' to generate a little torque, so that the induction motor is not started properly.

Moreover, if the target frequency is lower than a current operation speed of the induction motor, the induction motor is in a regenerative region. Then, the induction motor won't be operated with a simple voltage control method of the inverter.

SUMMARY OF THE INVENTION

Therefore, an object of the present invention is to provide a rotation speed search apparatus for an induction motor and its control method that are capable of driving an induction motor without causing any excessiveness to an inverter in any circumstances.

To achieve these and other advantages and in accordance with the purpose of the present invention, as embodied and broadly described herein, there is provided a rotation speed search apparatus including: a voltage control unit for comparing a rated current of a motor and a current detected from the motor and generating an output voltage; and a frequency control unit for comparing a reference excitation current of the motor and an excitation current detected from the motor and generating an output frequency.

In the rotation speed search apparatus of the present invention, the voltage control unit includes: a first comparator for comparing a frequency corresponding to a rated current and a frequency corresponding to a current detected from the motor; an output voltage generator for multiplying a value obtained from comparison by a certain constant for increasing or decreasing an increase speed of the compared frequency and generating a final output voltage through a V/F control; and a second comparator for performing a feed-forward controlling by accumulating a frequency prior to certain time point corresponding to the output voltage and a frequency corresponding to the compared current.

In the rotation speed search apparatus of the present invention, the frequency control unit includes: a third comparator for comparing a frequency corresponding to the reference excitation current of the motor and the frequency corresponding to the excitation current detected from the motor; a PI controller for performing a PI controlling on the compared frequency and outputting it; a fourth comparator for comparing the outputted frequency and a target frequency, and outputting a comparison value; and an output frequency selector for comparing the compared frequency and a frequency corresponding to the output voltage of the voltage control unit, and selecting and outputting a greater frequency to thereby prevent generation of an error in the motor and the inverter.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention, together with the description, explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
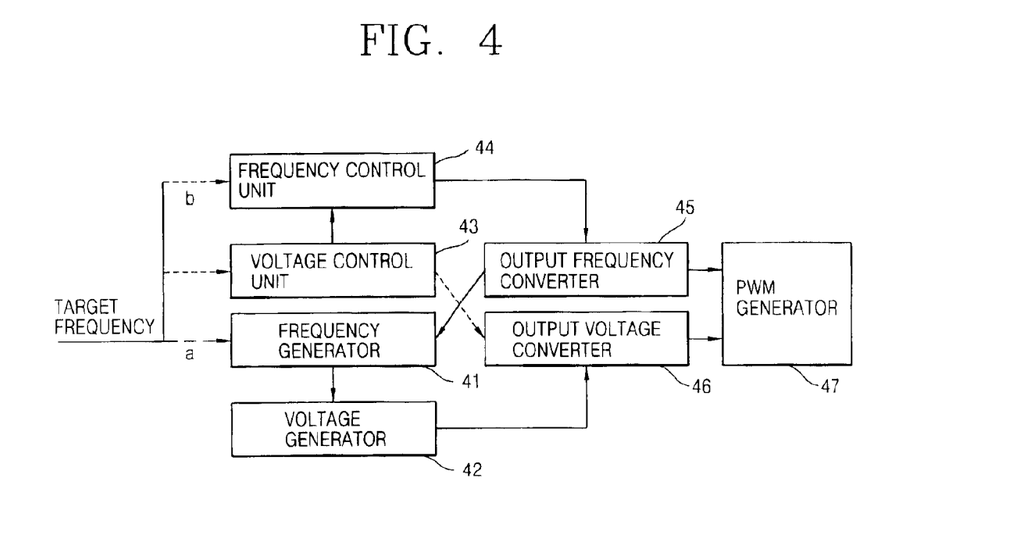
FIG. 4 is a schematic block diagram of a rotation speed search apparatus in accordance with the present invention.

FIG. 4 is a schematic block diagram of a rotation speed search apparatus in accordance with the present invention.

As illustrated, the rotation speed search apparatus in accordance with the present invention includes: a voltage control unit 43 for comparing a rated current of a motor and a current detected from the motor and generating an output voltage; a frequency control unit 44 for comparing a reference excitation current of the motor and an excitation current detected from the motor and generating an output frequency; and an output frequency selector 64 for comparing the frequency according to the output voltage of the voltage control unit 43 and the output frequency of the frequency control unit 44 and selecting a final output frequency.

The voltage control unit 43 includes: a first comparator 51 for comparing a frequency corresponding to a rated current and a frequency corresponding to a current detected from the motor; an output voltage generator 52 for multiplying a value obtained from comparison by a certain constant for increasing or decreasing an increase speed of the compared frequency and generating a final output voltage through a V/F control; and a second comparator 53 for performing a feed-forward controlling by accumulating a frequency prior to certain time point corresponding to the output voltage and a frequency corresponding to the compared current.

The frequency control unit 44 includes: a third comparator 61 for comparing a frequency corresponding to the reference excitation current of the motor and the frequency corresponding to the excitation current detected from the motor; a PI controller 62 for performing a PI controlling on the compared frequency and outputting it; a fourth comparator 63 for comparing the outputted frequency and a target frequency, and outputting it; and an output frequency selector 64 for comparing the compared frequency and a frequency corresponding to the output voltage of the voltage control unit, and selecting and outputting a greater frequency to thereby prevent generation of an error in the motor and the inverter.

The operation principle of the rotation speed search apparatus, as described above, will now be explained.

First, if the motor is normally accelerated, the operation, as shown in FIG. 1, is performed, whereby the processes are the same as the rotation speed search processes of the conventional art.

However, if a motor speed is searched in an abnormal situation, unlike the conventional art, the motor is started by the two control units (that is, the frequency control unit and the voltage control unit independently from the rotation speed search process).

In other words, a target frequency according to a user's input is inputted to a PWM generator 47 through the voltage control unit 43 and the frequency control unit 44, not through the frequency generator 41 and the voltage generator 42.

Thereafter, the PWM generator 47 converts a final frequency outputted through the frequency control unit 43 and the voltage control unit 44 into a PWM signal and inputs it to the motor, thereby starting the motor.

The motor speed search process will now be described in detail with reference to FIGS. 5 through 7.

Figure 5:
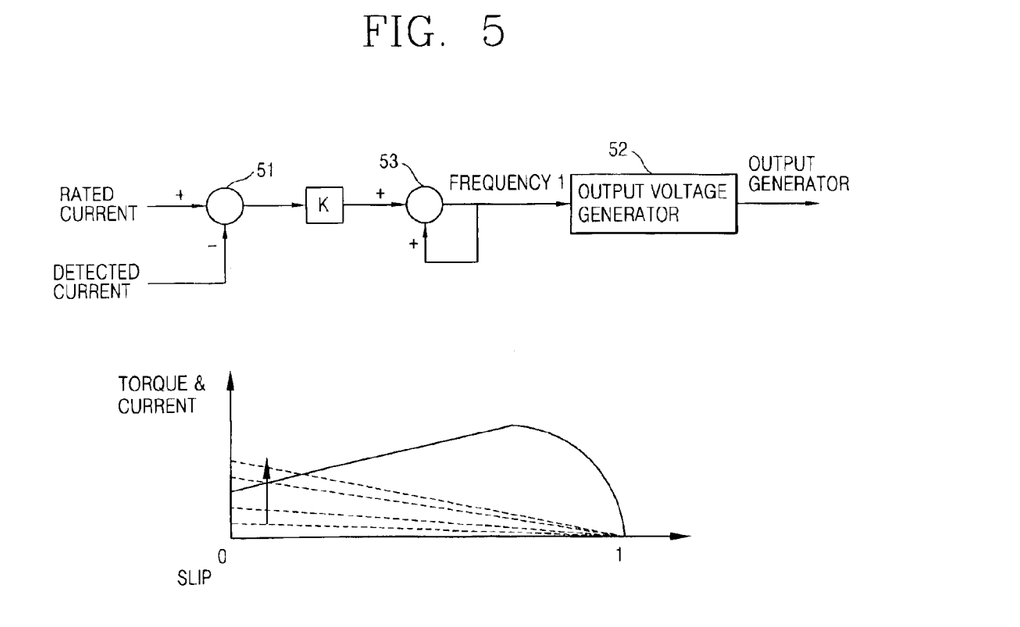
FIG. 5 is an exemplary view showing an operation of a voltage control unit of FIG. 4 in accordance with the present invention.

FIG. 5 is an exemplary view showing an operation of a voltage control unit of FIG. 4 in accordance with the present invention.

First, the first comparator 51 compares a frequency corresponding to a rated current and a current detected from the motor. Herein, the first comparator 51 performs a calculation of subtracting the detected current from the rated current through the comparison.

Thereafter, the output voltage generator 52 multiplies the compared frequency by a certain constant (K) indicating a speed of a frequency increase/decrease, and generates a final output voltage through a V/F control. Herein, the certain constant (K) is a random proportional gain value, multiplied to an output value of the first comparator, and serves to increase or decrease an increase speed of a finally produced frequency.

And then, the second comparator 53 accumulates a frequency prior to a certain time point corresponding to the output voltage of the output voltage generator 52 and a frequency corresponding to the compared current, thereby performing a feed-forward controlling.

Consequently, the output voltage is increased from '0' to the target voltage. In this respect, the size of the voltage increase can be controlled by using the difference between the detected current presently flowing at the motor and the pre-set rated current.

Namely, if the difference between the detected current and the rated current is big (that is, if the actual current is small), the voltage increase is controlled to be great, whereas if the difference between the detected current and the rated current is small (that is, if the actual current is big), the voltage increase is controlled to be small, so that the output voltage can be increased up to the target voltage within the shortest time.

The output voltage is increased from '0' to a voltage prior to speed searching. When the detected current, which presently flows, is within the pre-set rated current, the output voltage can be increased to reach the target voltage within the shortest time.

Thus, the output voltage can be increased without causing any excessiveness to the inverter and the motor. Further, since the motor is automatically accelerated depending on the load state, it is not necessary for the user to set an acceleration time in advance.

Figure 6:
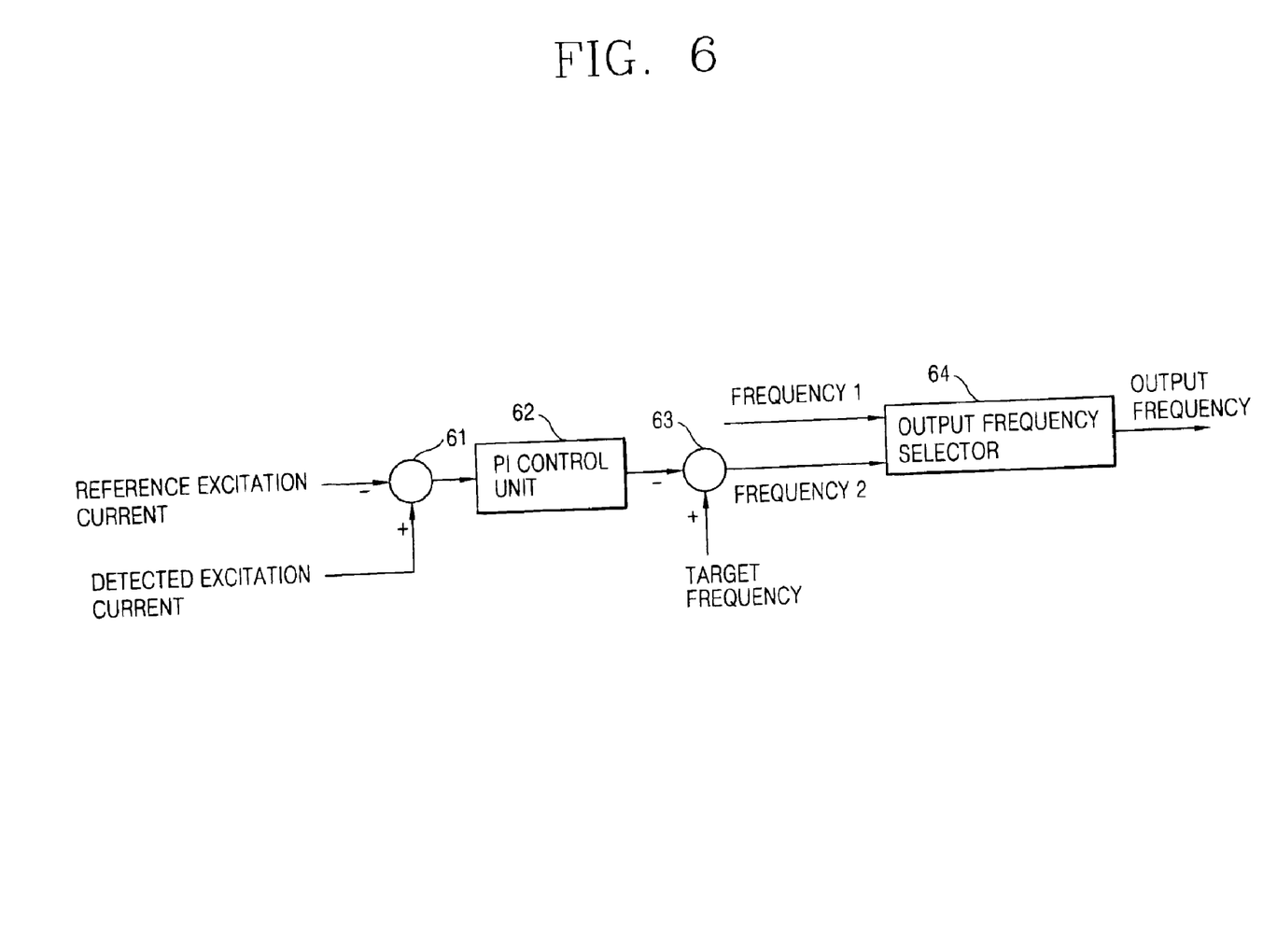
FIG. 6 is an exemplary view showing an operation of a frequency control unit and an output frequency selector of FIG. 4 in accordance with the present invention.

FIG. 6 is an exemplary view showing an operation of a frequency control unit and an output frequency selector of FIG. 4 in accordance with the present invention.

First, the third comparator 61 compares a frequency corresponding to a reference excitation current of the motor and a frequency corresponding to an excitation current detected from the motor, and outputs the comparison value to the PI controller 62. Herein the third comparator 61 performs a calculation of subtracting the reference excitation current from the detected excitation current through a comparison process.

Thereafter, the PI controller 62 performs a PI control on the outputted frequency and outputs it to the fourth comparator. Then, the fourth comparator 63 compares the outputted frequency to the target frequency and outputs the comparison value. Herein, the fourth comparator performs a calculation of subtracting the output frequency from the target frequency through a comparison process.

Subsequently, in order to prevent occurrence of an error in the motor and the inverter due to an over-excitation situation of the motor, the output frequency selector 64 compares a frequency corresponding to a final output voltage of the voltage control unit 44, and selects and outputs a greater frequency.

To sum up, the output frequency starts from the target frequency prior to occurrence of the speed searching situation. If the d-axis component current (excitation current) flowing at the motor is above the reference excitation current, the output frequency is reduced, from which the speed of the motor is estimated. If the d-axis component current is below the reference excitation current, the output frequency is increased again. In this manner, the output frequency is variably controlled to increase a starting torque and the motor can be accelerated regardless of the load.

Figure 7:
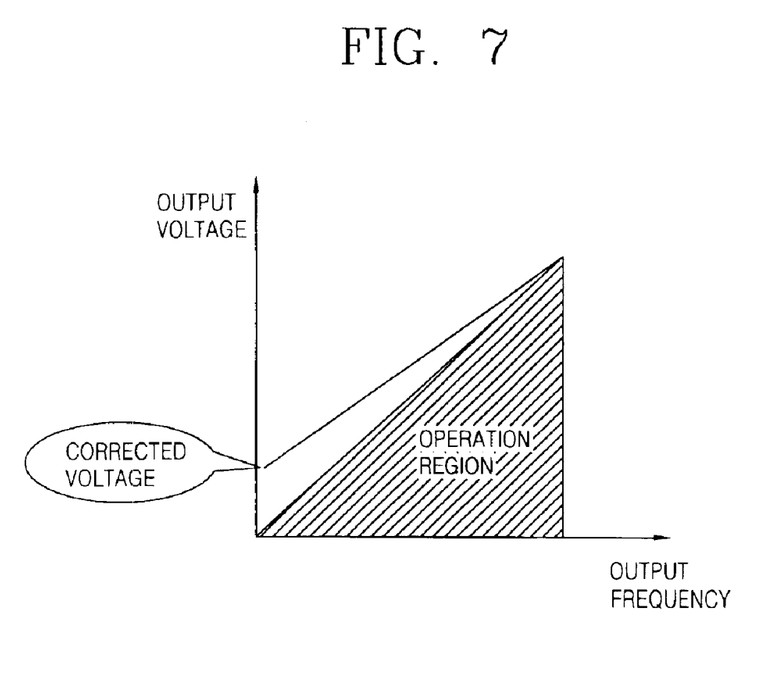
FIG. 7 is a graph showing a method for determining an output frequency of the output frequency selector in accordance with the present invention.

FIG. 7 is a graph showing a method for determining an output frequency of the output frequency selector in accordance with the present invention.

The minimum output frequency is determined by the output voltage of the voltage control unit 43. If the output frequency of the frequency control unit 44 is below the minimum frequency, the minimum frequency determined by the voltage control unit 43 is outputted as a minimum output frequency. This will now be described in detail.

In general, the induction motor has a constant V/F ratio (i.e., 60 Hz 220V). Thus, if a voltage (i.e., 60 Hz 300V) more than that is applied to the motor, the motor would be damaged or an overcurrent flows to the inverter.

In order to solve this problem, the minimum output frequency is determined as a voltage obtained by the voltage control unit 43. If the output frequency of the frequency control unit 44 is below the minimum frequency, the minimum output frequency determined by the voltage control unit is outputted as a final output frequency.

However, if the minimum frequency is simply determined by using the V/F ratio used in the V/F control method, a desired torque would not be generated in the low frequency domain due to a voltage drop because of a resistance component of the motor. Thus, in order to complement this, as shown in FIG. 7, a voltage corresponding to the frequency as much as a rated slip can be compensated.

As so far described, the apparatus and method for searching a rotation speed of an induction motor of the present invention has many advantages.

First, since the output voltage is increased by using the actual current flowing at the motor, it is not necessary to set acceleration time additionally from outside, and the output voltage is increased optimally to reach a target voltage in any circumstances.

Second, in case of a big load, an output frequency is reduced. Thus, the slip of the motor is moved to a slip where a maximum torque is generated to enable the induction motor to start.

Third, if the speed of the motor in operation is greater than a target frequency, an output frequency is increased, so that the motor can be operated even in the regenerative region of the motor.

Fourth, the present invention solves the problem of the algorithm of the conventional art, and especially, the algorithm of the present invention can be simply applied when plural motors are connected to one load, such as a fan or a pump load, and started, Lastly, the present invention can be implemented independently from the algorithm for driving the motor in the existing inverter. Thus, its application is more wide.

As the present invention may be embodied in several forms without departing from the spirit or essential characteristics thereof, it should also be understood that the above-described embodiments are not limited by any of the details of the foregoing description, unless otherwise specified. Rather, they should be construed broadly within its spirit and scope, as defined in the appended claims. Therefore, all changes and modifications that fall within the metes and bounds of the claims, or equivalence of such metes and bounds are therefore intended to be embraced by the appended claims.

What is claimed is:

1. A rotation speed search apparatus for an induction motor comprising:

a voltage control unit for comparing a rated current of a motor and a current detected from the motor and generating an output voltage;

a frequency control unit for comparing a reference excitation current of the motor and an excitation current detected from the motor and generating an output frequency; and an output frequency selector for comparing the frequency according to the output voltage of the voltage control unit and the output frequency of the frequency control unit and selecting a final output frequency.

2. The apparatus of claim 1, wherein the voltage control unit comprises a first comparator for comparing a frequency corresponding to a rated current and a frequency corresponding to a current detected from the motor;

an output voltage generator for multiplying a value obtained from a first comparator by a value indicating an increase/decrease speed of the compared frequency of the first comparator and generating a final output voltage by performing a V/F control; and a second comparator for performing a feed-forward control by accumulating a frequency corresponding to the output voltage and a frequency corresponding to the compared current for a predetermined time period.

3. The apparatus of claim 2, wherein the first comparator subtracts the detected current from the rated current.

4. The apparatus of claim 2, wherein the second comparator accumulates a frequency corresponding to the output voltage of the output voltage generator and a frequency corresponding to the compared current for the predetermined time period.

5. The apparatus of claim 1, wherein the frequency control unit comprises:

a third comparator for comparing a frequency corresponding to the reference excitation current of the motor and the frequency corresponding to the excitation current detected from the motor;

a PI controller for performing a PI control on and outputting the compared frequency of the third comparator and outputting the PI controlled frequency;

a fourth comparator for comparing the outputted frequency of the PI controller and a target frequency, and outputting a comparison value.

6. The apparatus of claim 1, wherein the output frequency selector compares the frequency outputted from the frequency control unit and a frequency corresponding to the output voltage of the voltage control unit, and selectively outputs a a largest of the compared frequencies to thereby prevent generation of an error in the motor and the inverter.

7. The apparatus of claim 5, wherein the third comparator subtracts the reference excitation current from the detected excitation current.

8. The apparatus of claim 5, wherein the fourth comparator subtracts the output frequency form the target frequency.

9. A rotation speed search method for an induction motor comprising:

comparing a rated current of a motor and a current detected from the motor to generate an output voltage by voltage control;

comparing a reference excitation current of the motor and an excitation current detected from the motor to generate an output frequency by frequency control;

comparing a frequency according to the output voltage and the output frequency to select a final output frequency;

converting the final output frequency into a PWM signal; and transmitting the PWM signal to the motor, thereby starting the motor.

10. The method of claim 9, wherein the voltage control comprises:

subtracting the detected current from the rated current of the motor to obtain a result value;

multiplying a value with a frequency corresponding to the result value to obtain a resulting value; and adding the resulting value to the output frequency, thereby generating the output voltage.

11. The method of claim 9, wherein the frequency control comprises:

subtracting the reference excitation current from the excitation current detected from the motor to obtain a result value;

performing a PI control on the result values; and subtracting a resulting value obtained by performing the PI control from a target frequency, thereby generating the output frequency.

12. The method of claim 9, wherein, comparing the frequency, comprises:

comparing the output frequency of the frequency control to a frequency corresponding to the output voltage determined in the voltage control; and selecting as an output frequency a largest of the compared frequencies.

* * * * *

UNITED STATES PATENT AND TRADEMARK OFFICE
CERTIFICATE OF CORRECTION

PATENT NO. : 6,900,614 B2
DATED : May 31, 2005
INVENTOR(S) : Seung-Ho Na It is certified that error appears in the above-identified patent and that said Letters Patent is hereby corrected as shown below:

Column 8,
Line 15, "form" should be -- from --.
Line 47, "values" should be -- value --.

Signed and Sealed this

Seventh Day of February, 2006

JON W. DUDAS
*Director of the United States Patent and Trademark Office*